(12) United States Patent
Zhang et al.

(10) Patent No.: US 12,047,666 B2
(45) Date of Patent: Jul. 23, 2024

(54) CAMERA MODULE AND ELECTRONIC DEVICE

(71) Applicant: VIVO MOBILE COMMUNICATION CO., LTD., Dongguan (CN)

(72) Inventors: Fuyin Zhang, Dongguan (CN); Dongcun Cheng, Dongguan (CN); Wei Wang, Dongguan (CN); Zhengjun Luo, Dongguan (CN); Zongwen He, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 183 days.

(21) Appl. No.: 17/893,641

(22) Filed: Aug. 23, 2022

(65) Prior Publication Data

US 2022/0407997 A1 Dec. 22, 2022

Related U.S. Application Data

(63) Continuation of application No. PCT/CN2021/074667, filed on Feb. 1, 2021.

(30) Foreign Application Priority Data

Feb. 28, 2020 (CN) .......................... 202010133791.0

(51) Int. Cl.
*H04N 23/57* (2023.01)
*H04N 23/54* (2023.01)
(Continued)

(52) U.S. Cl.
CPC ............. *H04N 23/57* (2023.01); *H04N 23/54* (2023.01); *H04N 23/55* (2023.01); *H04N 23/685* (2023.01)

(58) Field of Classification Search
CPC ........ H04N 23/57; H04N 23/54; H04N 23/55; H04N 23/685; H04N 23/51; H04N 23/50
See application file for complete search history.

(56) References Cited

U.S. PATENT DOCUMENTS 8,668,637 B2 3/2014 Tanahashi
2009/0189987 A1 7/2009 Muramatsu et al.
(Continued)

FOREIGN PATENT DOCUMENTS

CN 101543395 A 9/2009
CN 106534654 A 3/2017
(Continued)

*Primary Examiner* — Padma Haliyur
(74) *Attorney, Agent, or Firm* — The Webb Law Firm (57) ABSTRACT

A camera module includes a bracket, a rotatable module, a first magnetic member, and a second magnetic member; the bracket is provided with a rotating cavity, the rotatable module comprises a camera and a rotating body, the camera is fixedly connected to the rotating body, the rotating body is rotatably disposed in the rotating cavity, and a distance between a center of gravity of the rotatable module and a geometric center of the rotatable module is greater than 0; the first magnetic member is disposed on the bracket, the second magnetic member is disposed on the rotating body, at least one of the first magnetic member or the second magnetic member is an electromagnetic member, and the first magnetic member is disposed opposite to the second magnetic member; and in a case that the electromagnetic member is not energized, the camera can rotate under a force of gravity.

15 Claims, 5 Drawing Sheets

(51) Int. Cl.
*H04N 23/55* (2023.01)
*H04N 23/68* (2023.01)

(56) References Cited

U.S. PATENT DOCUMENTS

| | | | |
|---|---|---|---|
| 2014/0125824 A1 | 5/2014 | Takizawa | |
| 2016/0161828 A1* | 6/2016 | Lee | G02B 7/04 359/824 |
| 2020/0084348 A1* | 3/2020 | Zhang | H04N 23/57 |
| 2021/0124145 A1* | 4/2021 | Zhang | G02B 27/646 |

FOREIGN PATENT DOCUMENTS

| | | | |
|---|---|---|---|
| CN | 107204051 A | | 9/2017 |
| CN | 109040573 A | | 12/2018 |
| CN | 109484661 A | | 3/2019 |
| CN | 110166667 A | | 8/2019 |
| CN | 110716368 A | | 1/2020 |
| CN | 111212209 A | | 5/2020 |
| CN | 113225472 A | * | 8/2021 |
| JP | 2005311758 A | | 11/2005 |
| JP | 2016086247 A | | 5/2016 |
| JP | 2017016114 A | | 1/2017 |
| KR | 1020180105807 A | | 10/2018 |

* cited by examiner

CAMERA MODULE AND ELECTRONIC DEVICE

CROSS-REFERENCE TO RELATED APPLICATIONS

This application is a Bypass Continuation Application of PCT/CN2021/074667 filed Feb. 1, 2021, and claims priority to Chinese Patent Application No. 202010133791.0 filed Feb. 28, 2020, the disclosures of which are hereby incorporated by reference in their entirety.

BACKGROUND OF THE INVENTION

Field of the Invention

The present application relates to the field of communications technologies, and in particular, to a camera module and an electronic device.

Description of Related Art

With the rapid development of the electronic device, the electronic device is used more and more widely, and electronic devices such as a mobile phone, a tablet computer, and the like play an increasingly important role in people's work, life, and entertainment. In particular, with the development of Internet social media in recent years, users are increasingly concerned about advantages and disadvantages of an image capturing function of the electronic device while pursuing a more convenient operating system of the electronic device.

Currently, many people use the electronic device to take pictures or shoot videos. During a process of taking pictures, people may inevitably shake a camera module due to hand shaking, bracket vibration, or other factors. Once shaking occurs, the photos or videos may be blurred, thus affecting user experience. Therefore, how to solve the problem of shaking the camera module during use has always been a difficulty in the field of camera apparatus technologies. In the process of solving this problem, the electronic image stabilization or the optical image stabilization (OIS) technologies are usually used in the camera module.

However, a structure of the OIS technology is relatively complicated, and a compensation for the large-scale shaking is poor; and a main defect of the electronic image stabilization technology is: since the sensitivity is increased for image stabilization, in a case of high sensitivity, there may be noises in a shooting screen, thus reducing the image quality of the screen. Moreover, the algorithm of electronic image stabilization technology is complex, and a lot of calculations are required in the process of adjusting the camera. It can be seen that the existing image stabilization cannot solve the shaking problem of the camera module well.

SUMMARY OF THE INVENTION

According to a first aspect, an embodiment of the present application discloses a camera module, where the camera module includes a bracket, a rotatable module, a first magnetic member, and a second magnetic member; the bracket is provided with a rotating cavity, the rotatable module includes a camera and a rotating body, the camera is fixedly connected to the rotating body, the rotating body is rotatably disposed in the rotating cavity, and a distance between a center of gravity of the rotatable module and a geometric center of the rotatable module is greater than 0; the first magnetic member is disposed on the bracket, the second magnetic member is disposed on the rotating body, at least one of the first magnetic member or the second magnetic member is an electromagnetic member, and the first magnetic member is disposed opposite to the second magnetic member; and in a case that the electromagnetic member is not energized, the camera can rotate under a force of gravity.

According to a second aspect, an embodiment of the present application discloses an electronic device, including a housing and the camera module, where the housing is provided with an accommodating groove, the camera module is disposed in the accommodating groove, and a bottom surface of the accommodating groove is matched with the rotating body to limit the rotating body.

BRIEF DESCRIPTION OF DRAWINGS

To describe the technical solutions in the embodiments of the present application or in the background art more clearly, the drawings required for describing the embodiments or the background art are described briefly below. Obviously, other drawings can be obtained by those of ordinary skill in the art based on these drawings.

Reference numerals in the accompanying drawings are as follows:

100—bracket, 110—rotating cavity, 120—first recessed portion, 200—rotatable module, 210—camera, 220—rotating body, 221—second recessed portion, 222—accommodating space, 300—first magnetic member, 400—second magnetic member, 500—housing, 510—accommodating groove, 511—bottom surface, 600—strip-shaped circuit board.

1200—electronic device, 1201—radio frequency unit, 1202—network module, 1203—audio output unit, 1204—input unit, 12041—graphics processing unit, 12042—microphone, 1205—sensor, 1206—display unit, 12061—display panel, 1207—user input unit, 12071—touch panel, 12072—another input device, 1208—interface unit, 1209—memory, 1210—processor, 1211—power supply.

DESCRIPTION OF THE INVENTION

To make the objects, technical solutions, and advantages of the present application clearer, the following clearly describes the technical solutions of the present application with reference to specific embodiments of the present application and corresponding accompanying drawings. Apparently, the described embodiments are merely some rather than all of the embodiments of the present application. Based on the embodiments of the present application, all other embodiments obtained by a person of ordinary skill in the art fall within the protection scope of the present application.

The technical solutions disclosed by various embodiments of the present application are described in detail below with reference to the accompanying drawings.

Referring to FIG. 1 to FIG. 4, embodiments of the present application disclose a camera module, and the disclosed camera module includes a bracket 100 and a rotatable module 200.

Figure 1:
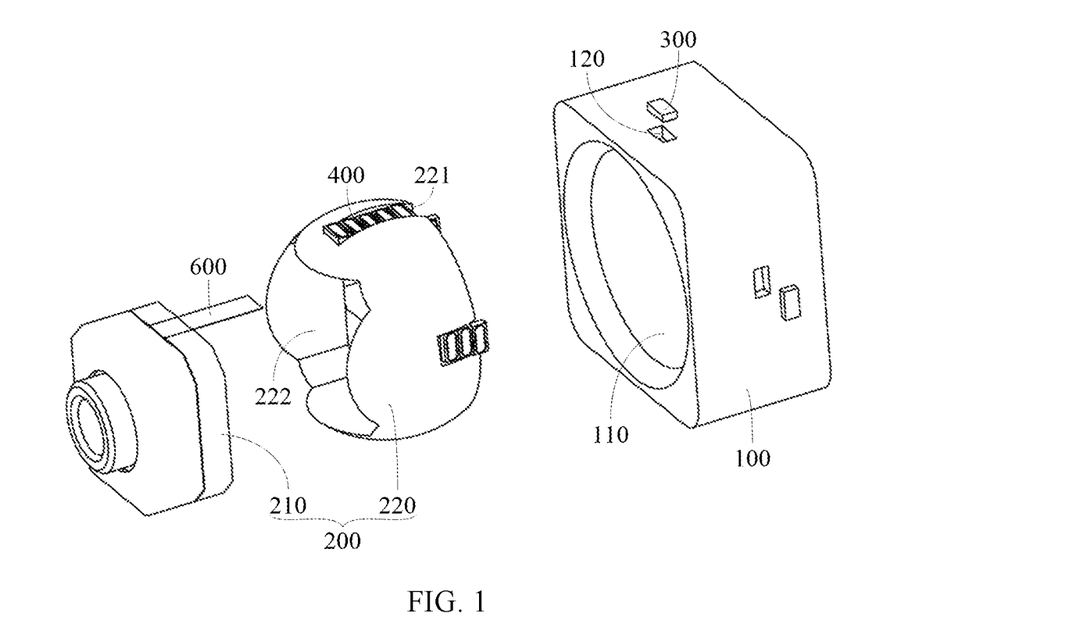
FIG. 1 is a schematic exploded diagram of a camera module according to an embodiment of the present application.
Figure 2:
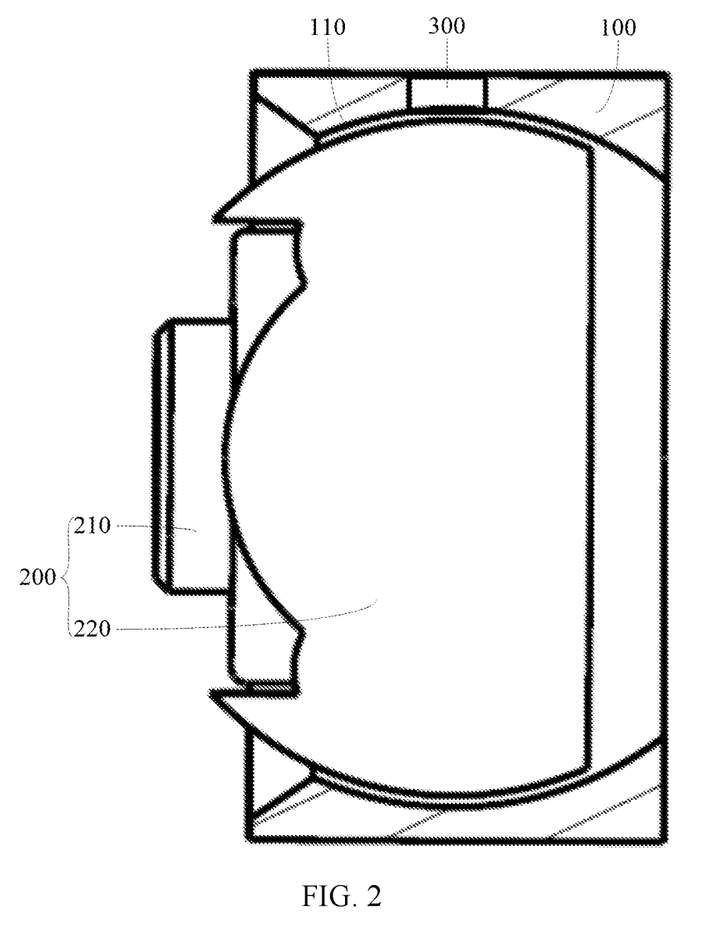
FIG. 2 is a sectional view of a camera module according to an embodiment of the present application.
Figure 3:
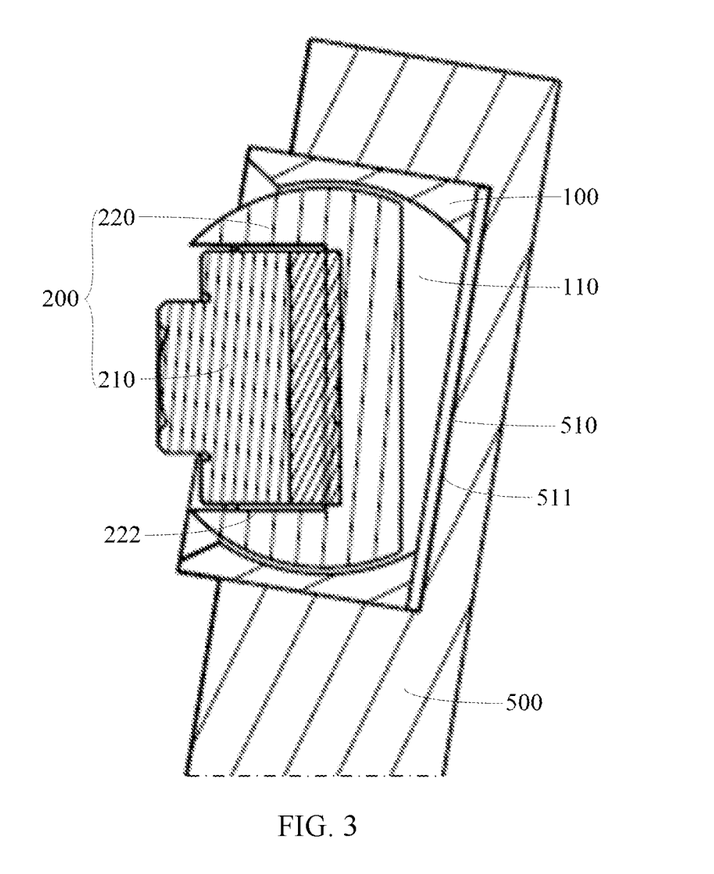
FIG. 3 and FIG. 4 are schematic diagrams of a camera module in shaking according to an embodiment of the present application.
Figure 4:
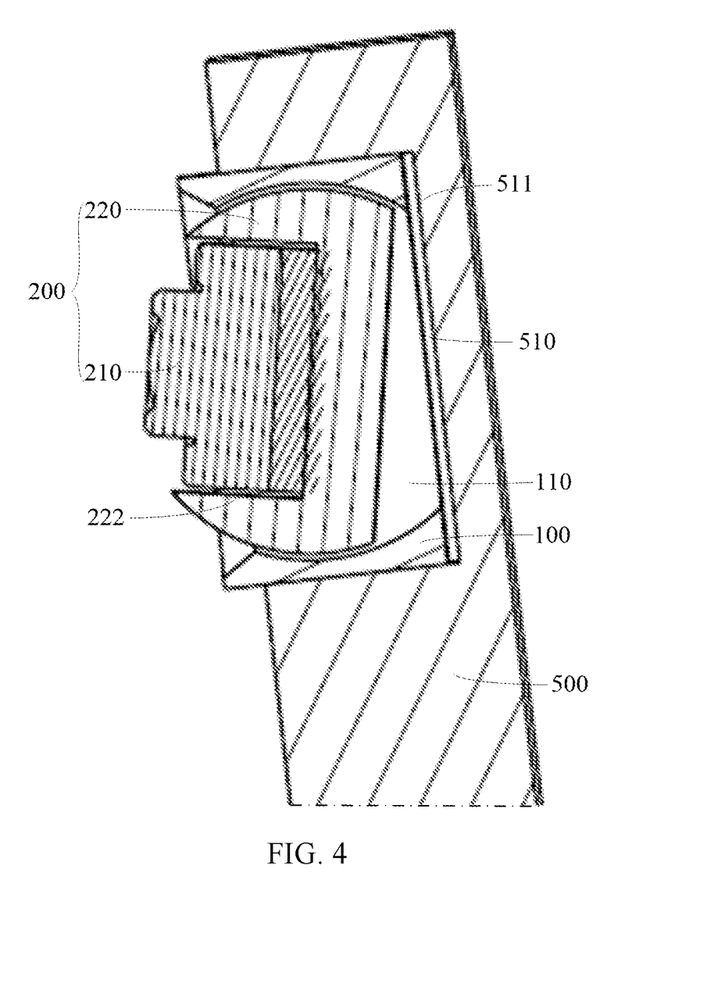

The bracket 100 is a basic component of the camera module, and provides an installation basis for other components of the camera module. The bracket 100 is provided with a rotating cavity 110.

The rotatable module 200 includes a camera 210 and a rotating body 220. There are various types of cameras 210, such as an analog camera, a digital camera, and the like. This is not limited in this embodiment of the present application. A specific structure and an operating principle of the camera 210 are well-known technologies, and are not repeated herein.

The camera 210 is fixedly connected to the rotating body 220, and the distance between the center of gravity of the rotatable module 200 and the geometric center of the rotatable module 200 is greater than 0. Therefore, the rotatable module 200 is in the eccentric structure. The rotating body 220 is rotatably disposed in the rotating cavity 110, so that the rotating body 220 can rotate relative to the rotating cavity 110, thereby driving the camera 210 to rotate.

In this embodiment of the present application, the eccentrically disposed rotatable module 200 rotates under the force of gravity. Optionally, the camera module further includes a first magnetic member 300 and a second magnetic member 400. At least one of the first magnetic member 300 or the second magnetic member 400 is an electromagnetic member. The first magnetic member 300 is disposed on the bracket 100, the second magnetic member 400 is disposed on the rotating body 220, and the first magnetic member 300 is disposed opposite to the second magnetic member 400.

In a case that the electromagnetic member is not energized, the camera 210 may rotate under the force of gravity, thereby achieving the image stabilization effect. In a case that the electromagnetic member is energized, a magnetic force is formed between the first magnetic member 300 and the second magnetic member 400, and the magnetic force enables the bracket 100 and the rotating body 220 to rotate relative to each other, and parameters such as an amplitude and a speed of the bracket 100 and the rotating body 220 in relative rotation can be controlled.

Exemplarily, the first magnetic member 300 and the second magnetic member 400 may be of various types, for example, the first magnetic member 300 may be an electromagnetic member, the second magnetic member 400 may be a permanent magnet, or both the first magnetic member 300 and the second magnetic member 400 are electromagnetic members. Optionally, the first magnetic member 300 is a permanent magnet, and the second magnetic member 400 may be an electromagnetic member. The electromagnetic member is disposed on the rotating body 220, and the camera 210 may be electrically connected to the electromagnetic member. Therefore, it is convenient to supply power to the electromagnetic member and simplify the way of electrical connection of the electromagnetic member. When the first magnetic member 300 is disposed on the bracket 100, since the permanent magnet does not need to be electrically connected, and the cost of the permanent magnet is lower, the cost can be reduced, and the first magnetic member 300 can be conveniently disposed.

In this embodiment of the present application, the camera 210 is disposed on the rotating body 220, which constitutes the rotatable module 200. The rotatable module 200 is in an eccentric structure, and the rotating body 220 can rotate relative to the rotating cavity 110 of the bracket 100. When the camera 210 is shaking, the eccentrically disposed rotatable module 200 enables the rotating body 220 to rotate relative to the rotating cavity 110 under the force of gravity, so that the rotatable module 200 can basically remain in place. In this case, an orientation of the camera 210 can be kept basically unchanged, so that the light entering the camera 210 can be stable. In addition, when the electromagnetic member is energized, the magnetic force between the first magnetic member 300 and the second magnetic member 400 enables the rotating body 220 to rotate more accurately, so that the position of the rotatable module 200 can be adjusted more accurately. The rotatable module 200 can more stably remain in place under the eccentric setting and the magnetic force, so that the orientation of the camera 210 remains unchanged. Therefore, a generation time of the image stabilization effect of the camera module is shorter, and the image stabilization effect is better.

Optionally, there may be a plurality of first magnetic members 300 and a plurality of second magnetic members 400, and a quantity of the first magnetic members 300 is equal to a quantity of the second magnetic members 400. The plurality of second magnetic members 400 are distributed at intervals along a direction around an optical axis of the camera 210. For example, the plurality of first magnetic members 300 are disposed in one-to-one correspondence with the plurality of second magnetic members 400. The plurality of first magnetic members 300 and the plurality of second magnetic members 400 can drive the rotating body 220 to rotate around directions of a plurality of rotation axes, so that the camera module can be adjusted more comprehensively and accurately. In this way, the shaking problem of the camera module during use can be better solved, so that the shaking of the camera module will not or hardly affect the shooting effect of the camera 210.

In some embodiments of the present application, there are three second magnetic members 400, and connection lines connecting any two of the second magnetic members 400 are the first connection line, the second connection line, and the third connection line. The first connection line, the second connection line, and the third connection line form an isosceles right triangle, and the second magnetic members 400 are regularly distributed on the rotating body 220, so that the plurality of first magnetic members 300 and the plurality of second magnetic members 400 can drive the rotating body 220 to rotate in a relatively balanced manner. Therefore, the rotatable module 200 can be adjusted stably, and thus, the stability of the camera module is higher. When the rotating cavity of the camera module is in the shape of a sphere or cube, the three second magnetic members may be disposed in a same vertical plane; and when the rotating cavity of the camera module is in the shape of an ellipsoid or in other shapes, the three second magnetic members may be disposed in a same plane, but there may be an angle between this plane and the vertical plane.

In other embodiments of the present application, when there are three second magnetic members 400, the first connection line, the second connection line, and the third connection line form an equilateral triangle, so that the three second magnetic members 400 are evenly arranged. When the rotating cavity of the camera module is in the shape of a sphere or cube, the three second magnetic members may be disposed in a same vertical plane; and when the rotating cavity of the camera module is in the shape of an ellipsoid or in other shapes, the three second magnetic members may be disposed in a same plane, but there may be an angle between this plane and the vertical plane.

There may also be certainly two second magnetic members 400, and in this case, an angle formed by connection lines separately from the two second magnetic members 400 to the geometric center may be 180°. There may also be four second magnetic members 400, and in this case, among the four second magnetic members 400, connection lines from any two adjacent second magnetic members 400 to the geometric center may be perpendicular to each other. Moreover, there may also be five second magnetic members 400, and in this case, among the five second magnetic members 400, an angle formed by connection lines separately from any two adjacent second magnetic members 400 to the geometric center may approximately equal to 72°. By analogy, there may be more second magnetic members 400, which is not limited in the embodiments of the present application.

From the foregoing description, it can be seen that when there are three second magnetic members 400, connection lines connecting any two of the second magnetic members 400 are the first connection line, the second connection line, and the third connection line, and the first connection line, the second connection line, and the third connection line form an isosceles right triangle, the plurality of first magnetic members 300 and the plurality of second magnetic members 400 can drive the rotating body 220 to rotate in a relatively balanced manner. In addition, because there are a few second magnetic members 400, a space occupied by the second magnetic members 400 is smaller, and the cost of the camera module may also be reduced.

When the magnetic force on the electromagnetic member is relatively constant, the distance between the first magnetic member 300 and the second magnetic member 400 may change as the rotating body 220 rotates. When the distance between the first magnetic member 300 and the second magnetic member 400 increases, the force between the first magnetic member 300 and the second magnetic member 400 may gradually decrease, resulting in a relatively poor rotating effect of the rotating body 220. Therefore, in an optional solution, the electromagnetic member may include a plurality of sub-coils, and the plurality of sub-coils are arranged in sequence along an optical axis direction of the camera 210, so that in a process that the first magnetic member 300 and the second magnetic member 400 drive the rotating body 220 to move, a magnetic field between the first magnetic member 300 and the second magnetic member 400 can basically remain stable, and thus the force between the first magnetic member 300 and the second magnetic member 400 is relatively stable. Therefore, the rotating body 220 can rotate stably, the rotating effect of the rotating body 220 is improved, and the adjustment effect for the camera 210 is improved.

Optionally, the camera module may further include a plurality of controllers, and the plurality of controllers are electrically connected to the plurality of sub-coils, so that each of the sub-coils can be controlled independently. In this solution, each sub-coil is controlled independently, so that the magnetic force on the electromagnetic member may be adjusted based on the rotation of the rotatable module 200. Therefore, it is convenient to control the rotation of the rotatable module 200, and the image stabilization effect is better. For example, whether the sub-coil is energized, an amount of a current, and the like may be controlled. For example, when there are five sub-coils, and the electronic device is shaken to a lesser extent, the first magnetic member and the second magnetic member only need to exert a small adjustment force on the rotatable module. Therefore, the electronic device can control a controller of each sub-coil, so that three of the five sub-coils are used to control the image stabilization operation of the camera, and the other two sub-coils are in a non-operating state. Certainly, those skilled in the art can understand that the other two sub-coils may also be supplied with extremely small currents, so that a force exerted by the sub-coils on the first magnetic member is lower than a force exerted by other three sub-coils on the first magnetic member.

In this embodiment of the present application, optionally, the rotating body 220 may be provided with a second recessed portion 221. The second magnetic member 400 is disposed in the second recessed portion 221, and the second magnetic member is coplanar with the second recessed portion, so as to prevent the second magnetic member 400 protruding from an outer surface of the rotating body 220 from hindering the rotation of the rotating body 220. Thus, the rotating body can rotate stably and smoothly. In addition, the second magnetic member 400 is located in the second recessed portion 221, which can reduce a space occupied by the second magnetic member 400 and the rotating body 220, thereby improving a space utilization rate of the camera module.

Optionally, the bracket 100 may be provided with a first recessed portion 120, the first magnetic member 300 may be disposed in the first recessed portion 120, and the first magnetic member is coplanar with the first recessed portion. In this way, an appearance of an overall structure including the bracket 100 and the first magnetic member 300 may be relatively flat. In addition, since the first magnetic member 300 is located in the first recessed portion 120, the space occupied by the first magnetic member 300 and the bracket 100 can be smaller, and a space utilization rate of the electronic device can be improved.

The camera 210 may be disposed on the rotating body 220 in various manners, such as bonding, clamping, or screwing, which is not limited in this embodiment of the present application. In an optional solution, the rotating body 220 may be provided with an accommodating space 222, and the camera 210 is at least partially located in the accommodating space 222. In this case, a size of the camera module in the optical axis direction of the camera 210 is relatively small, which is more conducive to miniaturization of the camera module, thereby reducing a thickness of the electronic device and improving user experience of the electronic device.

In an optional solution, both the rotating body 220 and the rotating cavity 110 may be in the shape of a sphere, and compared with the rotating body and the rotating cavity in a rectangular shape, there is a smaller gap between the rotating body 220 and the rotating cavity 110 in the shape of a sphere, which facilitates the relative rotation, and facilitates position adjustment of the rotatable module 200.

The camera 210 needs to be connected to other device data (for example, a motherboard of an electronic device), so that the camera 210 can transmit data to other devices. Optionally, the camera module may further include a strip-shaped circuit board 600, the camera 210 is electrically connected to the strip-shaped circuit board 600, and the strip-shaped circuit board 600 extends in the optical axis direction of the camera 210, so that the camera 210 can be electrically connected to other devices through the strip-shaped circuit board 600, thereby facilitating data transmission between the camera 210 and other devices. This electrical connection method is simple, reliable, and easy to achieve.

Certainly, the camera 210 may also perform data connection with other devices in other ways. In another optional embodiment, the camera 210 may be provided with a wireless transmission module, and the camera 210 may perform data transmission with other devices through the wireless transmission module.

Based on the camera module disclosed in the embodiments of the present application, an electronic device is further disclosed in an embodiment of the present application. The disclosed electronic device includes the camera module described in any of the foregoing embodiments, so that the electronic device configured with the foregoing camera module has a better shooting effect, thereby improving the user experience of the electronic device.

Figure 5:
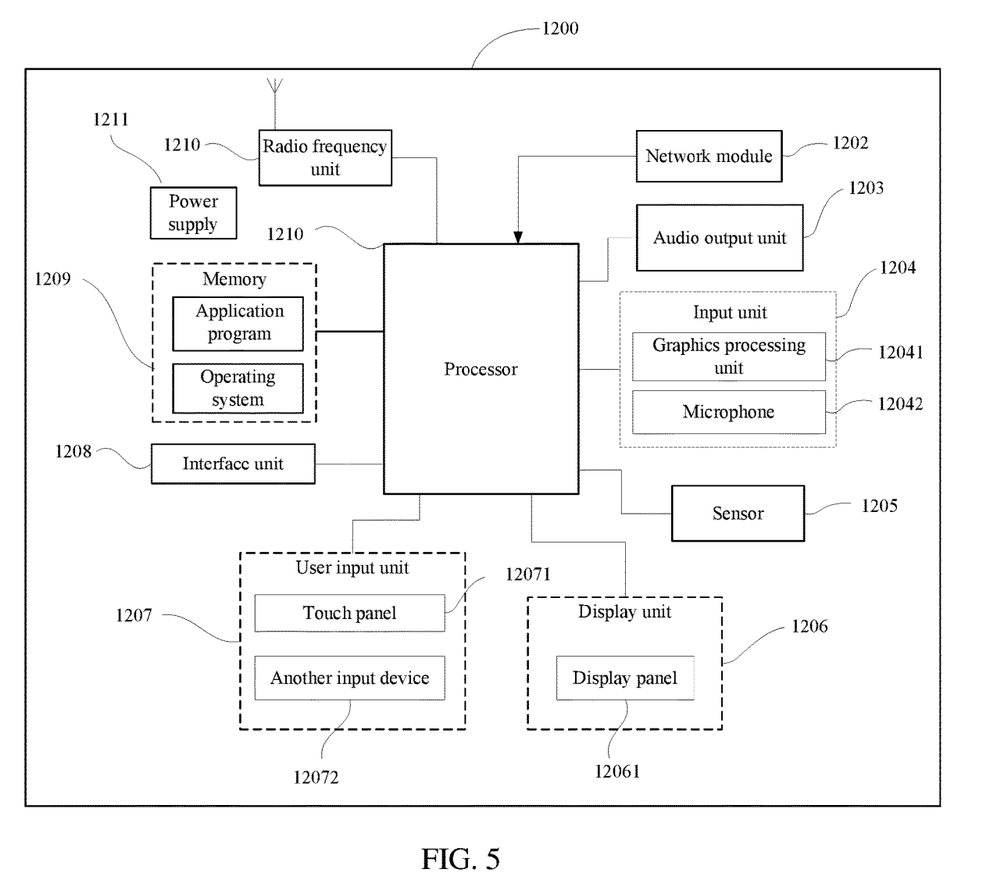
FIG. 5 is a schematic diagram of an electronic device according to an embodiment of the present application.

Optionally, the electronic device may further include a housing 500, the housing 500 is provided with an accommodating groove 510, the camera module is disposed in the accommodating groove 510, and a bottom surface 511 of the accommodating groove 510 is matched with the rotating body 220 to limit the rotating body 220. The bottom surface 511 is a groove bottom of the accommodating groove 510. The bottom surface 511 may be opposite to the rotating body 220 in the optical axis direction of the camera 210. When a rotating angle of the rotating body 220 is relatively large, the rotating body 220 may touch the bottom surface 511, so that it is difficult for the rotating body 220 to continue to rotate in a current direction. In this case, the bottom surface 511 can prevent the rotating body 220 from falling out of the rotating cavity 110 due to an excessively large rotating angle, thereby improving the reliability of the electronic device.

Optionally, both a surface of the bracket 100 facing the bottom surface 511 and the bottom surface 511 may be flat surfaces, so that a distance between the surface of the bracket 100 facing the bottom surface 511 and the bottom surface 511 is smaller. Moreover, the distance may be in close contact, so that the structure of the electronic device is more compact, which may reduce the space occupied by the camera module, and a thickness of the electronic device are smaller, which facilitates a light and thin design of the electronic device.

In this embodiment of the present application, a connection line connecting a center of gravity of the rotatable module 200 and a geometric center of the rotatable module 200 may be parallel to the bottom surface 511. When the camera module is installed on the electronic device, this solution can be used to enable the orientation of the camera 210 to be perpendicular to the bottom surface 511, so as to ensure that the camera module can be installed in place, and avoid that the camera module needs to be adjusted with the image stabilization function thereof due to the inclined installation during the installation process, which may occupy an image stabilization range. Therefore, it is avoided that the image stabilization range of the camera module is not enough in a large shake during use, thereby improving the image stabilization effect of the electronic device.

Optionally, the housing 500 may have a top end, a distance between the center of gravity of the rotatable module 200 and the top end is a first distance, a distance between the geometric center of the rotatable module 200 and the top end is a second distance, and the first distance may be greater than the second distance. It should be noted that the top end of the housing 500 refers to a relatively high end of the electronic device when a user uses the electronic device, namely, an end of the electronic device that is usually provided with a rear camera module. This solution can be used to ensure that the camera module is correctly installed on the electronic device, and ensure a relative positional relationship between the camera module and the electronic device from the beginning. In addition, it is avoided that in the subsequent process of using, the orientation of the camera module is reversed due to gravity, and the orientation of the camera is in an abnormal direction, which causes the user to be unable to perform the shooting operation smoothly. Finally, the user experience is improved.

In order to prevent the camera 210 from being affected by external water vapor, in an optional embodiment, the outer wall of the camera module may be provided with a waterproof member to prevent water vapor from entering the camera module, which causes the camera module to fail. Thereby, a protection level of the electronic device is improved, and the reliability of the electronic device is further improved. The waterproof member may be in a ring structure, and is disposed on an edge of the rotating body of the camera module and abuts with the camera, so that there is almost no gap between the camera and the rotating body, which can effectively prevent liquid or damp gas from damaging the camera. Certainly, the waterproof member may also be a waterproof coating disposed on the outside of the entire camera module, which can effectively prevent intrusion of liquid or damp gas caused by the gap between the camera module and the electronic device, resulting in damage.

Based on the camera module disclosed in the embodiments of the present application, an embodiment of the present application further discloses a control method for the camera module, and the disclosed control method includes the following steps.

S110. Detect a shaking parameter of the camera module.

S120. Calculate a theoretical compensation amount based on the shaking parameter.

S130. Generate a first control signal based on the theoretical compensation amount.

S140. Control an electromagnetic member to operate based on the first control signal, and drive a rotatable module 200 to move in the theoretical compensation amount.

Optionally, the shaking parameter may be a positional relationship such as an angle or a distance between the camera module and an object to be photographed, which is not limited in this embodiment of the present application. When the shake occurs in the camera during use, the electronic device may detect the shaking parameter of the camera module, and the electronic device can calculate the theoretical compensation amount based on the shaking parameter, and generate the first control signal based on the theoretical compensation amount. Thus the electromagnetic member is controlled to be energized. When the electromagnetic member is energized, a force is generated between the first magnetic member 300 and the second magnetic member 400, and then the rotatable module 200 can be driven to move in the theoretical compensation amount to realize compensation for the camera 210. In this way, the light entering the camera 210 is kept stable, so that the shaking problem of the camera module during use can be better solved, and the problem of blurred images caused by the shaking of the camera module can be effectively solved.

The camera module usually has an automatic focusing function, and therefore, the change of the distance between the camera module and the object to be photographed has little effect on the shooting quality. However, when the camera module swings, the camera module cannot face the object to be photographed, and in the light reflected by the object to be photographed, only a small part of the light enters the camera module, resulting in poor imaging quality of the camera module. In an optional embodiment, the shaking parameter may be a shaking angle, the theoretical compensation amount may be a rotation angle, and the rotatable module 200 moves at the rotation angle, so that the camera module can face the object to be photographed, and the camera 210 can stably face the object to be photographed. Therefore, in the light reflected by the object to be photographed, more light can enter the camera module, and thus, the imaging quality of the camera module is higher.

When an unexpected situation occurs in the camera module (such as insufficient magnetic force of the target electromagnetic member, the rotatable module 200 is blocked by other external forces, or the theoretical compensation amount is incorrectly calculated), it may be difficult for the camera module to move to a position required for shooting. Based on this, in an optional solution, after driving the rotatable module to move in the theoretical compensation amount, the disclosed control method may further include the following steps.

S150. Detect an actual compensation amount of the camera module.

S160. Calculate a deviation between the actual compensation amount and the theoretical compensation amount.

S170. When the deviation is greater than or smaller than 0, generate a second control signal based on the deviation.

S180. Control an electromagnetic member to operate based on the second control signal, and drive a rotatable module to move in the deviation. This solution can further improve the compensation accuracy for the camera 210 and prevent the camera 210 from not moving to the position required for shooting, thereby improving the image stabilization accuracy of the camera module, and further improving the shooting effect of the camera module.

Based on the camera module and the control method disclosed in the embodiments of the present application, an embodiment of the present application further discloses an electronic device. The disclosed electronic device includes the camera module described in any of the foregoing embodiments, and further includes: a first detection module, configured to detect a shaking parameter of the camera module; a first processing module, configured to calculate a theoretical compensation amount based on the shaking parameter, and generate a first control signal based on the theoretical compensation amount; and a first control module, configured to control the electromagnetic member to operate based on the first control signal, and drive the rotatable module to move in the theoretical compensation amount, so as to adjust the camera module. As a result, the camera module can be rotated stably, avoiding the poor photographing effects of the electronic device due to shaking.

Optionally, the first detection module may be used to detect the shaking angle, and the first processing module may be used to calculate the rotation angle based on the shaking angle.

When the compensation for the camera module is not in place, optionally, after driving the rotatable module to move in the theoretical compensation amount, the electronic device may further include: a second detection module, configured to detect an actual compensation amount of the camera module; a second processing module, configured to calculate a deviation between the actual compensation amount and the theoretical compensation amount; a determining module, configured to determine whether the deviation is greater than or smaller than 0; a third processing module, configured to: when the deviation is greater than or smaller than 0, generate a second control signal based on the deviation; and a second control module, configured to control the electromagnetic member to operate based on the second control signal, and then drive the rotatable module to move in the deviation. Thus, the camera module can be adjusted more precisely, so that the camera module can accurately move to the position required for shooting.

The electronic device provided in this embodiment of the present application can implement the processes that are implemented by the electronic device in the foregoing method embodiments. To avoid repetition, details are not described herein again.

FIG. 5 is a schematic structural diagram of hardware of an electronic device according to the embodiments of the present application. The electronic device 1200 includes but is not limited to components such as a radio frequency unit 1201, a network module 1202, an audio output unit 1203, an input unit 1204, a sensor 1205, a display unit 1206, a user input unit 1207, an interface unit 1208, a memory 1209, a processor 1210, and a power supply 1211. A person skilled in the art may understand that a structure of the electronic device shown in FIG. 5 constitutes no limitation on the electronic device, and the electronic device may include more or fewer components than those shown in the figure, or a combination of some components, or an arrangement of different components. In this embodiment of the present application, the electronic device includes but is not limited to a mobile phone, a tablet computer, a notebook computer, a palmtop computer, an in-vehicle terminal, a wearable device, a pedometer, and the like.

The processor 1210 is configured to: detect a shaking parameter of the camera module, and calculate a theoretical compensation amount based on the shaking parameter. The first control signal is generated based on the theoretical compensation amount, and the first control signal may trigger the processor 1210, so that the processor 1210 controls the electromagnetic member to operate. The processor 1210 drives the rotatable module to move in the theoretical compensation amount, so as to compensate the shaking of the camera module, so that the light entering the camera module remains stable. Therefore, the problem of shaking of the camera module during use can be better solved. Finally, the problem of blurred images caused by shaking of the electronic device can be effectively solved.

It should be understood that, in this embodiment of the present application, the radio frequency unit 1201 may be configured to receive and send information or receive and send a signal in a call process. For example, after downlink data from a base station is received, the processor 1210 processes the downlink data. In addition, uplink data is sent to the base station. Generally, the radio frequency unit 1201 includes but is not limited to an antenna, at least one amplifier, a transceiver, a coupler, a low noise amplifier, and a duplexer. In addition, the radio frequency unit 1201 may also communicate with a network and other devices through a wireless communication system.

The electronic device provides users with wireless broadband Internet access through the network module 1202, for example, helps users receive and send e-mails, browse web pages, and access streaming media.

The audio output unit 1203 may convert audio data received by the radio frequency unit 1201 or the network module 1202 or stored in the memory 1209 into an audio signal, and output the audio signal as sound. Moreover, the audio output unit 1203 can further provide audio output related to a specific function performed the electronic device 1200 (for example, call signal receiving sound and message receiving sound). The audio output unit 1203 includes a speaker, a buzzer, a telephone receiver, and the like.

The input unit 1204 is configured to receive audio or radio frequency signals. The input unit 1204 may include a graphics processing unit (GPU) 12041 and a microphone 12042. The graphics processing unit 12041 is used to process image data of a static picture or a video obtained by an image capturing device (for example, a camera) in a video capturing mode or an image capturing mode. A processed image frame may be displayed on the display unit 1206. The image frame processed by the graphics processing unit 12041 may be stored in the memory 1209 (or another storage medium) or sent by using the radio frequency unit 1201 or the network module 1202. The microphone 12042 may receive sound and can process such sound into audio data. The processed audio data may be converted in a call mode into a format that can be sent by the radio frequency unit 1201 to a mobile communication base station for outputting.

The electronic device 1200 further includes at least one sensor 1205, for example, a light sensor, a motion sensor, and another sensor. For example, the light sensor includes an ambient light sensor and a proximity sensor. The ambient light sensor may adjust brightness of a display panel 12061 according to ambient light brightness. The proximity sensor may switch off the display panel 12061 and/or backlight when the electronic device 1200 moves close to an ear. As a motion sensor, an accelerometer sensor may detect magnitude of acceleration in various directions (usually three axes), may detect magnitude and the direction of gravity when stationary, may be configured to identify electronic device postures (such as switching between a landscape mode and a portrait mode, related games, and magnetometer posture calibration), may perform functions related to vibration identification (such as a pedometer and a knock), and the like. The sensor 1205 may further include a fingerprint sensor, a pressure sensor, an iris sensor, a molecular sensor, a gyroscope, a barometer, a hygrometer, a thermometer, an infrared sensor, or the like. Details are not described herein again.

The display unit 1206 is configured to display information entered by the user or information provided for the user. The display unit 1206 may include the display panel 12061, and the display panel 12061 may be configured in a form of a liquid crystal display (LCD), an organic light-emitting diode (OLED), or the like.

The user input unit 1207 may be configured to receive entered number or character information, and generate key signal input related to user settings and function control of the electronic device. For example, the user input unit 1207 includes a touch panel 12071 and another input device 12072. The touch panel 12071 is also referred to as a touchscreen, and may collect a touch operation of the user on or near the touch panel (for example, an operation performed on or near the touch panel 12071 by the user by using any appropriate object or accessory such as a finger or a stylus). The touch panel 12071 may include two parts: a touch detection apparatus and a touch controller. The touch detection apparatus detects a touch location of the user, detects a signal brought by the touch operation, and sends the signal to the touch controller. The touch controller receives touch information from the touch detection apparatus, converts the touch information into touch point coordinates, sends the touch point coordinates to the processor 1210, and receives and executes a command sent by the processor 1210. In addition, the touch panel 12071 may be implemented as a resistive type, a capacitive type, an infrared type, a surface acoustic wave type, or the like. The user input unit 1207 may include another input device 12072 in addition to the touch panel 12071. For example, the other input devices 12072 may include but are not limited to: a physical keyboard, a function key (such as a volume control key, a switch key), a trackball, a mouse, and a joystick, which is no longer repeated here.

Optionally, the touch panel 12071 may cover the display panel 12061. After detecting the touch operation on or near the touch panel 12071, the touch panel 12071 transmits the touch operation to the processor 1210 to determine a type of a touch event, and then the processor 1210 provides corresponding visual output on the display panel 12061 based on the type of the touch event. Although the touch panel 12071 and the display panel 12061 in FIG. 5 are configured as two independent components to implement input and output functions of the electronic device, in some embodiments, the touch panel 12071 and the display panel 12061 may be integrated to implement the input and output functions of the electronic device. Details are not limited herein.

The interface unit 1208 is an interface for connecting an external apparatus with the electronic device 1200. For example, the external apparatus may include a wired or wireless headset port, an external power supply (or battery charger) port, a wired or wireless data port, a storage card port, a port configured to connect to an apparatus having an identification module, an audio input/output (I/O) port, a video I/O port, a headset port, and the like. The interface unit 1208 may be configured to receive an input (for example, data information and power) from an external apparatus and transmit the received input to one or more elements in the electronic device 1200 or may be configured to transmit data between the electronic device 1200 and the external apparatus.

The memory 1209 may be configured to store a software program and various data. The memory 1209 may mainly include a program storage area and a data storage area. The program storage area may store an operating system, an application program required by at least one function (such as a sound playback function and an image playback function), and the like. The data storage area may store data (such as audio data and a phone book) created based on use of the electronic device, and the like. In addition, the memory 1209 may include a high-speed random access memory or a nonvolatile memory, for example, at least one disk storage device, a flash memory, or other volatile solid-state storage devices.

The processor 1210 is a control center of the electronic device, connects all parts of the entire electronic device by using various interfaces and lines, and performs various functions of the electronic device and data processing by running or executing a software program and/or a module that are/is stored in the memory 1209 and by invoking data stored in the memory 1209, to overall monitor the electronic device. The processor 1210 may include one or more processing units. Optionally, an application processor and a modem processor may be integrated into the processor 1210. The application processor mainly processes an operating system, a user interface, an application, and the like. The modem processor mainly processes wireless communication. It can be understood that, alternatively, the modem processor may not be integrated into the processor 1210.

The electronic device 1200 may further include the power supply 1211 (such as a battery) supplying power to each component. Preferably, the power supply 1211 may be logically connected to the processor 1210 by using a power management system, so as to implement functions such as charging management, discharging management, and power consumption management by using the power management system.

In addition, the electronic device 1200 includes some functional modules not shown. Details are not described herein again.

Optionally, an embodiment of the present application further provides an electronic device, including a processor 1210, a memory 1209, and a computer program stored in the memory 1209 and executable on the processor 1210. When the computer program is executed by the processor 1210, the foregoing processes of any method embodiment are implemented, and a same technical effect can be achieved. To avoid repetition, details are not described herein again.

The electronic device disclosed in the embodiments of the present application may be a smart phone, a tablet computer, an ebook reader, a wearable device (for example, a smart watch), a video game console, and the like. A specific type of the electronic device is not limited in the embodiments of the present application.

An embodiment of the present application further provides a non-transitory computer-readable storage medium. The non-transitory computer-readable storage medium stores a computer program. The computer program implements, when executed by a processor, the processes of any method embodiment, and a same technical effect can be achieved. To avoid repetition, details are not described herein again. The non-transitory computer-readable storage medium is, for example, a read-only memory (ROM for short), a random access memory (RAM for short), a magnetic disk, or an optical disc.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In the absence of more restrictions, an element defined by the statement "including a . . . " does not exclude another same element in a process, method, article, or apparatus that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation manner. Based on such understanding, the technical solutions of the present application essentially or the part contributing to the prior art may be implemented in a form of a software product. The computer software product is stored in a storage medium (such as a ROM/RAM, a magnetic disk, or an optical disc), and includes several instructions for instructing an electronic device (which may be a mobile phone, a computer, a server, an air conditioner, a network device, or the like) to perform the method according to the embodiments of the present application.

The embodiments of the present application are described above with reference to the accompanying drawings, but the present application is not limited to the foregoing specific implementations, and the foregoing specific implementations are only illustrative and not restrictive. Under the enlightenment of the present application, a person of ordinary skill in the art can make many forms without departing from the purpose of the present application and the protection scope of the claims, and all of these fall within the protection of the present application.

What is claimed is:

1. A camera module, comprising a bracket, a rotatable module, a first magnetic member, and a second magnetic member; wherein
the bracket is provided with a rotating cavity, the rotatable module comprises a camera and a rotating body, the camera is fixedly connected to the rotating body, the rotating body is rotatably disposed in the rotating cavity, and a distance between a center of gravity of the rotatable module and a geometric center of the rotatable module is greater than 0;
the first magnetic member is disposed on the bracket, the second magnetic member is disposed on the rotating body, at least one of the first magnetic member or the second magnetic member is an electromagnetic member, and the first magnetic member is disposed opposite to the second magnetic member; and
in a case that the electromagnetic member is not energized, the camera can rotate under a force of gravity.

2. The camera module according to claim 1, wherein there are a plurality of first magnetic members and a plurality of second magnetic members, and a quantity of the first magnetic members is equal to a quantity of the second magnetic members; and
the plurality of second magnetic members are distributed at intervals along a direction around an optical axis of the camera.

3. The camera module according to claim 2, wherein there are three second magnetic members, and connection lines connecting any two of the second magnetic members are a first connection line, a second connection line, and a third connection line, and the first connection line, the second connection line, and the third connection line form an isosceles right triangle.

4. The camera module according to claim 1, wherein the electromagnetic member comprises a plurality of sub-coils, and the plurality of sub-coils are disposed in sequence along an optical axis direction of the camera.

5. The camera module according to claim 4, further comprising a plurality of controllers, and the plurality of controllers are electrically connected to the plurality of sub-coils, so that each of the sub-coils can be controlled independently.

6. The camera module according to claim 1, wherein the rotating body and the rotating cavity are both spherical in shape.

7. An electronic device, comprising a housing and a camera module, wherein the housing is provided with an accommodating groove, the camera module is disposed in the accommodating groove;
the camera module comprises a bracket, a rotatable module, a first magnetic member, and a second magnetic member; wherein
the bracket is provided with a rotating cavity, the rotatable module comprises a camera and a rotating body, the camera is fixedly connected to the rotating body, the rotating body is rotatably disposed in the rotating cavity, and a distance between a center of gravity of the rotatable module and a geometric center of the rotatable module is greater than 0;
the first magnetic member is disposed on the bracket, the second magnetic member is disposed on the rotating body, at least one of the first magnetic member or the second magnetic member is an electromagnetic member, and the first magnetic member is disposed opposite to the second magnetic member;

in a case that the electromagnetic member is not energized, the camera can rotate under a force of gravity; and a bottom surface of the accommodating groove is matched with the rotating body to limit the rotating body.

8. The electronic device according to claim 7, wherein a connection line connecting a center of gravity of the rotatable module and a geometric center of the rotatable module is parallel to the bottom surface of the accommodating groove.

9. The electronic device according to claim 8, wherein the housing has a top end, a distance between the center of gravity of the rotatable module and the top end is a first distance, a distance between the geometric center of the rotatable module and the top end is a second distance, and the first distance is greater than the second distance.

10. The electronic device according to claim 7, wherein an outer wall of the camera module is provided with a waterproof member.

11. The electronic device according to claim 7, wherein there are a plurality of first magnetic members and a plurality of second magnetic members, and a quantity of the first magnetic members is equal to a quantity of the second magnetic members; and the plurality of second magnetic members are distributed at intervals along a direction around an optical axis of the camera.

12. The electronic device according to claim 11, wherein there are three second magnetic members, and connection lines connecting any two of the second magnetic members are a first connection line, a second connection line, and a third connection line, and the first connection line, the second connection line, and the third connection line form an isosceles right triangle.

13. The electronic device according to claim 7, wherein the electromagnetic member comprises a plurality of sub-coils, and the plurality of sub-coils are disposed in sequence along a direction around an optical axis of the camera.

14. The electronic device according to claim 13, further comprising a plurality of controllers, and the plurality of controllers are electrically connected to the plurality of sub-coils, so that each of the sub-coils can be controlled independently.

15. The electronic device according to claim 7, wherein the rotating body and the rotating cavity are both spherical in shape.

* * * * *